United States Patent Office 2,803,760
Patented Aug. 20, 1957

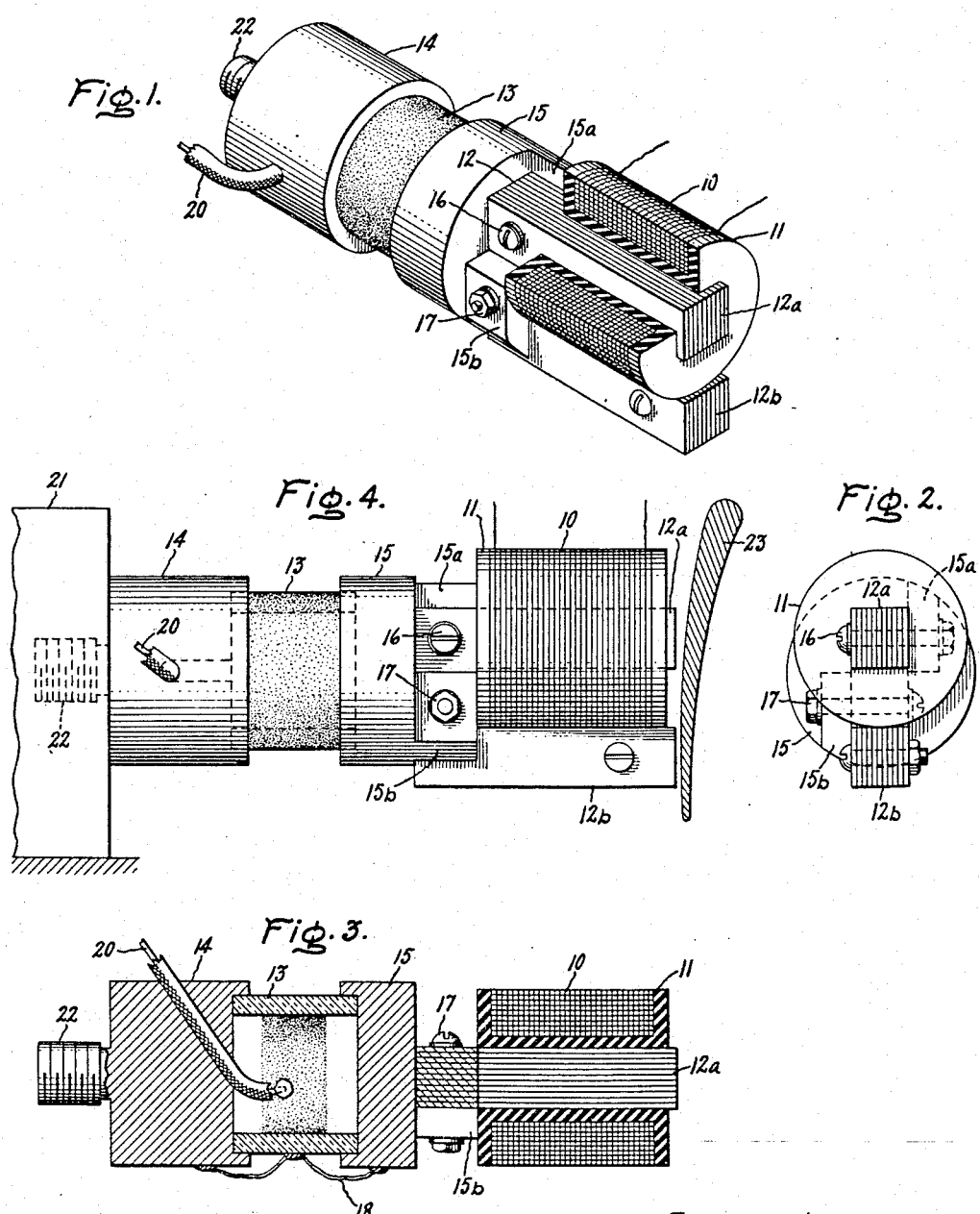

2,803,760

APPARATUS FOR PRODUCING AND MEASURING VIBRATORY FORCE

Robert L. Wall and Charles S. Duckwald, Schenectady, N. Y., assignors to General Electric Company, a corporation of New York Application November 22, 1954, Serial No. 470,387

5 Claims. (Cl. 310—8.4)

This invention relates to apparatus for producing and measuring vibratory forces.

In the field of vibration measurements, it is frequently desirable to apply a vibratory force of known magnitude and variable frequency to a magnetic system in order to obtain quantitative data regarding the vibration characteristics of that system. Accordingly, a primary object of the present invention is to provide apparatus for producing and measuring such vibratory force.

Another object is to provide such apparatus by means of which the vibratory force may be applied to a magnetic system without mechanical coupling to the system, thus eliminating the possibility of the coupling altering the vibration characteristics of the system under investigation.

Another object of the invention is to provide such a device which is operable to produce a vibratory force over a relatively wide range of frequencies.

Another object is to provide such apparatus in which the measuring means has high sensitivity to vibratory force applied by the apparatus to an object, and relatively low sensitivity to other forces that may act on the apparatus.

Apparatus constructed in accordance with the invention comprises an electromagnetic coil which, when energized by alternating current, produces periodic attracting forces on a magnetic object. The coil is supported by mounting means that also support a cylindrical piezoelectric element with the axes of the coil and piezoelectric element substantially parallel.

In opertaion, the apparatus is secured to a relatively immovable mass at the end remote from the coil, and the magnetic object to be vibrated is placed adjacent the outer end of the coil. When the coil is energized by alternating current, it exerts magnetic forces on the object that tend to cause the object to vibrate. As the vibratory force is applied to the object, a reaction force in the opposite direction is produced which acts upon the cylindrical piezoelectric element in a direction substantially parallel to its axis and causes the element to produce an output signal. The output signal is proportional to the vibratory force exerted on the magnetic object under test.

The novel features which are believed to be characteristic of the invention are set forth with particularity in the appended claims. The invention itself, however, both as to its organization and method of operation, together with further objects and advantages thereof, is best understood by reference to the following description taken in conjunction with the accompanying drawings, in which:

Fig. 1 is a perspective view partly broken away of apparatus constructed in accordance with the invention;

Fig. 2 is an end view of the apparatus of Fig. 1;

Fig. 3 is a sectional view of the apparatus; and

Fig. 4 is a view in elevation showing the apparatus mounted for operation.

As best seen in Fig. 1, the means for producing vibratory force comprises a coil 10 that may be energized from a conventional source of alternating current (not shown). The coil 10 is wound on a form 11 made of a conventional insulating material, and the form is mounted on a leg 12a of a U-shaped yoke or core 12. The other leg 12b of the core serves to provide a return path for the magnetic flux produced by energization of the coil 10. The core 12 may be either a solid or laminated magnetic structure, but laminated construction is preferred, as well known in the art.

The vibratory magnetic force produced by energization of the coil 10 is measured by means of a cylindrical piezoelectric element 13 mounted between end pieces 14 and 15, which are preferably constructed from an electrically conductive material such, for example, as stainless steel. As best seen in Fig. 2, the core 12 on which the coil 10 is mounted is secured to the end plate 15 by means of screws 16 and 17 extending through the core and through lugs 15a and 15b, respectively, on the end piece 15. The arms 12a and 12b of the core 12 extend outwardly from the end piece 15 in a direction substantially parallel to the longitudinal axis of the cylindrical piezoelectric element 13.

As shown in Fig. 3, the cylindrical piezoelectric element 13 fits into suitable depressions formed in the end plates 14 and 15, and is cemented secured in place. The inner and outer surfaces of the cylinder may be silver plated, in accordance with the usual practice in the art, and a strap 18 soldered to the end pieces 14 and 15 and the outer surface of the piezoelectric element to insure electrical connection therebetween. A shielded lead 20 is soldered to the silvered inner surface of the piezoelectric cylinder 13, and the shield is grounded to the end piece 14 through which the lead is brought out of the apparatus.

The cylindrical piezoelectric element 13, which may be made of a conventional piezoelectric material such as barium titanate, lead metaniobate, or a similar material, is polarized in the manner well known in the art so that its inner and outer surfaces are of opposite polarity. Because the outer surface of the element is grounded, it is preferred that the inner surface be positive and the outer surface negative. It is known that when a cylindrical piezoelectric element is activated in a radial direction, such as in the present case, the force sensitive axis of the element is at right angles to the longitudinal axis of the cylinder. If a force is applied in a direction parallel to the longitudinal axis of the cylinder, the sensitivity of the element is proportional to Poisson's ratio and Young's modulus of the material, where Poisson's ratio is defined as the ratio of transverse to longitudinal strain produced by longitudinal stress, and Young's modulus is the ratio of force applied per unit area to elongation per unit length. Thus, if the cylindrical piezoelectric element 13 is subjected to a longitudinal stress, an electrical charge is produced on its inner surface, and the charge is proportional to the longitudinal stress. One of the outstanding features of the present invention is that the piezoelectric element 13 is relatively insensitive to a bending force exerted thereon.

Referring to Fig. 4, the apparatus of the invention is shown mounted for use on a relatively large immovable mass 21 to prevent any motion of the apparatus. The apparatus may be mounted on a mass by means of a threaded stud 22 on the tail piece 14 or by any other suitable means. A magnetic object, such as a turbine bucket 23, whose vibration characteristics are to be investigated, is mounted adjacent the end of the core arm 12a on which the coil 10 is mounted. When the coil 10 is energized from a source of alternating current, a magnetic field is produced about the coil with a large part of the magnetic flux passing through the core 12 on which the coil is mounted. The direction of the magnetic flux from pole to pole of the electromagnetic coil reverses for each half-cycle of the alternating current that energizes the coil. Thus, the magnetic object under test is subjected to attracting magnetic forces during each half cycle of the coil energizing current and will tend to vibrate at twice the frequency of the energizing current. Considerable vibratory force may be exerted by the coil; for example, a peak force of approximately 0.5 pounds can be produced by a coil comprising 72 turns of .026 inch diameter wire mounted on a ¼" square core arm and energized by two amperes of alternating current. Because the apparatus is backed up by an immovable mass 21, the vibratory force applied to the object under test creates a reaction force that is proportional to the force exerted on the object under test. The reaction force is applied to the cylindrical piezoelectric element 13 in a direction substantially parallel to its longitudinal axis. The longitudinal stress produces a transverse strain in the walls of the cylindrical element, which causes the element to generate a charge on its inner surface. Thus, the electrical output signal from the piezoelectric element, which appears on the lead 20, has a frequency the same as that of the vibratory force applied to the object 23 under test and amplitude proportional to the force applied to the object under test.

The output signal of the piezoelectric element appearing on the lead 20 may be connected to the input of a cathode follower amplifier (not shown) or to an alternating current voltmeter. The use of a cathode follower amplifier is preferred because its high input impedance permits the output of the piezoelectric element to be independent of the frequency of vibration to a lower frequency level than is possible with low input impedance meters or amplifiers. A conventional alternating current voltmeter may be used to measure the output of the cathode follower amplifier, and the signal measured by the voltmeter is proportional to the vibratory force exerted on the object under test.

It is possible to cause the object under test to vibrate at the frequency of the coil energizing current rather than at twice that frequency. This may be accomplished by energizing the coil by a direct current along with an alternating current, so that the magnetic field about the coil pulsates at the frequency of the alternating current and does not reverse for alternate half cycles of the alternating current.

It has been found in practice that the sensitivity of the force measuring means is approximately 0.3 volts per pound force (instantaneous units) and is virtually independent of frequency over a range extending from 40 to 5,000 cycles per second, when the output of the piezoelectric element is connected to a high impedance cathode follower. With proper shielding, forces of .001 lb. or less may be measured over the entire frequency range.

While a particular embodiment of the invention has been illustrated, it will be understood that the invention has not been limited thereto, since various modifications in the apparatus may be made. It is contemplated by the appended claims to cover any such modifications as fall within the true spirit and scope of the invention.

What we claim as new and desire to secure by Letters Patent of the United States is:

1. Apparatus for producing and measuring vibratory force comprising substantially immovable mounting means, core means, a coil mounted on said core means, and a cylindrical piezoelectric element secured at one end to said mounting means and at the other end to said core means, with the axis of said cylindrical piezoelectric element substantially parallel to the axis of said coil.

2. Apparatus for producing and measuring vibratory force comprising a magnetic core, a coil mounted on said core and adapted to be energized by an alternating current, a pair of end pieces, a cylindrical piezoelectric element mounted between said end pieces, said magnetic core being secured to one of said end pieces with the axis of said coil mounted thereon being substantially parallel to the axis of said piezoelectric element, and substantially immovable mounting means secured to the other of said end pieces.

3. Apparatus for producing and measuring vibratory force comprising a substantially U-shaped magnetic core, a coil mounted on one of the arms of said core and adapted to be energized by an alternating current, a pair of end pieces, a cylindrical piezoelectric element mounted between said end pieces, said U-shaped core being secured to one of said end pieces with the arms of said core extending outwardly from said end piece in a direction substantially parallel to the axis of said cylindrical piezoelectric element, and substantially immovable mounting means secured to the other of said end pieces.

4. Apparatus for producing and measuring vibratory force comprising a magnetic core, a coil mounted on said core and adapted to be energized by an alternating current, a pair of end pieces, a cylindrical piezoelectric element mounted between said end pieces, said cylindrical piezoelectric element comprising barium titanate and being radially polarized, said magnetic core being secured to one of said end pieces with the axis of said coil mounted thereon being substantially parallel to the axis of said cylindrical piezoelectric element, and substantially immovable mounting means secured to the other of said end pieces.

5. Apparatus for producing and measuring vibratory force comprising a substantially U-shaped magnetic core, a coil mounted on one of the arms of said core, alternating current means for energizing said coil, a pair of end pieces, a cylindrical piezoelectric element mounted between said end pieces, said cylindrical piezoelectric element being radially polarized, said magnetic core being secured to one of said end pieces with the axis of said coil mounted thereon being substantially parallel to the axis of cylindrical piezoelectric element, and substantially immovable mounting means secured to the other of said end pieces.

References Cited in the file of this patent

UNITED STATES PATENTS

| | | |
|---|---|---|
| 2,625,663 | Howatt | Jan. 13, 1953 |
| 2,636,135 | Peek | Apr. 21, 1953 |
| 2,661,622 | Severs | Dec. 8, 1953 |